United States Patent
Sindhgatta et al.

(10) Patent No.: US 11,238,750 B2
(45) Date of Patent: Feb. 1, 2022

(54) EVALUATION OF TUTORING CONTENT FOR CONVERSATIONAL TUTOR

(71) Applicant: International Business Machines Corporation, Armonk, NY (US)

(72) Inventors: Renuka Sindhgatta, Bangalore (IN); Tejas Indulal Dhamecha, Bangalore (IN); Smitkumar Narotambhai Marvaniya, Bangalore (IN); Maria Chang, Irvington, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 16/168,391

(22) Filed: Oct. 23, 2018

(65) Prior Publication Data

US 2020/0126440 A1  Apr. 23, 2020

(51) Int. Cl.
*G09B 7/04* (2006.01)
*G06F 40/30* (2020.01)
*G06F 40/56* (2020.01)

(52) U.S. Cl.
CPC .............. *G09B 7/04* (2013.01); *G06F 40/30* (2020.01); *G06F 40/56* (2020.01)

(58) Field of Classification Search
None
See application file for complete search history.

(56) References Cited

U.S. PATENT DOCUMENTS

| 4,847,784 A | * | 7/1989 | Clancey | G09B 7/00 706/50 |
| 5,597,312 A | * | 1/1997 | Bloom | G09B 7/04 434/362 |
| 5,727,950 A | * | 3/1998 | Cook | G09B 19/06 434/350 |

(Continued)

OTHER PUBLICATIONS

Keith Brawner; "Rapid Dialogue and Branching Tutors"; GIFT_AIED; 2015; http://ceur-ws.org/Vol-1432/gift_pap10.pdf (Year: 2015).*

(Continued)

*Primary Examiner* — William D Ermlick
(74) *Attorney, Agent, or Firm* — Ference & Associates LLC (57) ABSTRACT

One embodiment provides a method, including: receiving, in an environment for developing a conversational tutor, domain content corresponding to a domain of the conversational tutor, wherein the conversational tutor comprises a conversational agent designed to assist students in learning a domain; receiving, at the environment, tutoring content developed by a user, wherein the tutoring content comprises a tutoring script comprising questions to be presented to the student during a tutoring session with the conversational tutor to assist the student in learning the domain; evaluating, within the environment, the tutoring content against the domain content, wherein the evaluating comprises (i) identifying missing tutoring content, (ii) identifying the difficulty of the tutoring content, and (iii) identifying question dependencies; and providing, at the environment, at least one recommendation, identified from results of the evaluation, for adjusting the tutoring content.

13 Claims, 5 Drawing Sheets

(56) References Cited

U.S. PATENT DOCUMENTS

| | | | | |
|---|---|---|---|---|
| 5,730,603 | A * | 3/1998 | Harless | G09B 5/065 |
| | | | | 434/308 |
| 5,904,485 | A * | 5/1999 | Siefert | G09B 5/14 |
| | | | | 434/322 |
| 6,315,572 | B1 | 11/2001 | Owens et al. | |
| 6,807,535 | B2 * | 10/2004 | Goodkovsky | G09B 7/04 |
| | | | | 706/3 |
| 7,716,056 | B2 * | 5/2010 | Weng | G10L 15/22 |
| | | | | 704/275 |
| 9,858,828 | B1 * | 1/2018 | Fuka | G09B 7/00 |
| 10,191,985 | B1 * | 1/2019 | Sarshar | G06F 16/355 |
| 2002/0107681 | A1 * | 8/2002 | Goodkovsky | G09B 7/04 |
| | | | | 703/22 |
| 2002/0107826 | A1 * | 8/2002 | Ramachandran | G09B 5/08 |
| | | | | 706/49 |
| 2002/0168621 | A1 * | 11/2002 | Cook | G09B 7/00 |
| | | | | 434/350 |
| 2004/0219494 | A1 | 11/2004 | Boon | |
| 2006/0024654 | A1 * | 2/2006 | Goodkovsky | G09B 7/02 |
| | | | | 434/350 |
| 2012/0052476 | A1 * | 3/2012 | Graesser | G09B 7/04 |
| | | | | 434/362 |
| 2013/0029308 | A1 * | 1/2013 | Graesser | G06Q 30/02 |
| | | | | 434/327 |
| 2013/0224714 | A1 * | 8/2013 | Ajmera | G09B 7/00 |
| | | | | 434/322 |
| 2014/0120513 | A1 * | 5/2014 | Jenkins | G06F 40/237 |
| | | | | 434/362 |
| 2014/0222746 | A1 * | 8/2014 | Gobert | G09B 5/02 |
| | | | | 706/47 |
| 2015/0064680 | A1 * | 3/2015 | Lee | G09B 7/02 |
| | | | | 434/350 |
| 2015/0074095 | A1 * | 3/2015 | Enders | G06F 16/24578 |
| | | | | 707/725 |
| 2015/0178623 | A1 * | 6/2015 | Balani | G06N 5/025 |
| | | | | 706/48 |
| 2015/0186526 | A1 * | 7/2015 | Rao | G06F 16/9535 |
| | | | | 707/610 |
| 2015/0186782 | A1 * | 7/2015 | Bohra | G09B 7/00 |
| | | | | 706/11 |
| 2016/0189034 | A1 * | 6/2016 | Shakeri | G09B 5/00 |
| | | | | 706/47 |
| 2017/0076622 | A1 | 3/2017 | Roberston et al. | |
| 2017/0212916 | A1 * | 7/2017 | Albert | G06F 40/30 |
| 2017/0358234 | A1 * | 12/2017 | Bohlen | G09B 7/077 |
| 2018/0096619 | A1 | 4/2018 | Fuka | |
| 2018/0253988 | A1 * | 9/2018 | Kanayama | G09B 5/06 |
| 2018/0301048 | A1 * | 10/2018 | Almassizadeh | G09B 5/14 |
| 2019/0088151 | A1 * | 3/2019 | Chen | G09B 19/04 |
| 2020/0320770 | A1 * | 10/2020 | Charlson | G06F 3/167 |
| 2020/0327818 | A1 * | 10/2020 | Byron | G09B 19/00 |

OTHER PUBLICATIONS

Debbie Brown; "Using GIFT as an Adaptation Engine for a Dialogue-Based Tutor"; 2014; https://books.google.com/books?hl=en&lr=&id=M62MBgAAQBAJ&oi=fnd&pg=PA163&ots=JRDNxBxSs-&sig=xlofbkmx43yiA_-kPVDkAHf7TcM#v=onepage&q&f=false (Year: 2014).*

Robby Robson; "Transforming Content into Dialogue-based Intelligent Tutors"; Jan. 2013; https://www.researchgate.net/publication/256067469_Transforming_Content_into_Dialogue-based_Intelligent_Tutors (Year: 2013).*

Kerly, Alice et al., "Bringing Chatbots into Education: Towards Natural Language Negotiation of Open Learner Models", Applications and Innovations in Intelligent Systems XIV—Proceedings of AI-2006, 26th SGAI International Conference on Innovative Techniques and Applications of Artificial Intelligence, 2006, 14 pages, Springer.

Murray, Tom, "Authoring Intelligent Tutoring Systems: An Analysis of the State of the Art", International Journal of Artificial Intelligence in Education (IJAIED), 1999, 32 pages.

Aleven, Vincent et al., "The Cognitive Tutor Authoring Tools (CTAT): Preliminary Evaluation of Efficiency Gains", In the Proceedings of the 8th International Conference on Intelligent Tutoring Systems, Jun. 26-30, 2006, Jhongli, Taiwan, 10 pages.

Cai, Zhiqiang et al., "ASAT: AutoTutor Script Authoring Tool", Design Recommendations for Intelligent Tutoring Systems, Authoring Tools & Expert Modeling Techniques, vol. 3, Chapter 17, 2015, 18 pages, U.S. Army Research Laboratory, Orlando, Florida.

* cited by examiner

| Question | Answer | # of concepts | Question Type | Question Answer Overlap | Answer length |
|---|---|---|---|---|---|
| Q1 | A1 | 5 | Verification | 1 | 20 |
| Q2 | A2 | 5 | Procedural | 0.2 | 25 |
| Q3 | A3 | 4 | Verification | 0.2 | 20 |
| Q4 | A4 | 1 | Causal | 0.1 | 100 |
| Q5 | A5 | 1 | Verification | 0.1 | 20 |
| . | . | | | | |
| . | . | | | | |
| . | . | | | | |
| Q24 | A24 | 3 | Procedural | 0 | 35 |
| Q25 | A25 | 3 | Procedural | 0 | 30 |

EVALUATION OF TUTORING CONTENT FOR CONVERSATIONAL TUTOR

BACKGROUND

When a user has a problem or question, the user may interact with a conversational agent, for example, chatbot, digital assistant, virtual assistant, or the like. Chatbots generally capture text-based input, for example, a user may access a conversational window and provide text input to the window. The chatbot then processes the input and provides a responsive output, usually as text-based output. Digital or virtual assistants may include assistants that receive voice input, process the voice input, and then provide a responsive output, for example, by audio, by performing a function, or the like. Conversational agents provide a method for a user to receive assistance with a problem or query without interfacing with a human user. The conversational agents are programmed to process input and provide output responsive to the input in a manner similar to how another human would engage in the conversation.

One type of conversational agent is a tutoring agent. A tutoring agent is a conversational agent that assists a student in learning a topic. The tutoring agent may present questions or output to the student related to a particular topic, similar to a human tutor or teacher. The student can then respond to the query or output either by using voice input that may be converted to text or by providing text input to the tutoring agent, for example, using a user interface associated with the tutoring agent. The tutoring agent then processes the response provided by the student to evaluate or assess the student's understanding of the topic. The evaluation may include identifying that the student does not have a complete or accurate understanding of the topic. Therefore, the tutoring agent may provide additional output to assist in improving the student's understanding of the topic.

BRIEF SUMMARY

In summary, one aspect of the invention provides a method comprising: receiving, in an environment for developing a conversational tutor, domain content corresponding to a domain of the conversational tutor, wherein the conversational tutor comprises a conversational agent designed to assist students in learning a domain; receiving, at the environment, tutoring content developed by a user, wherein the tutoring content comprises a tutoring script comprising questions to be presented to the student during a tutoring session with the conversational tutor to assist the student in learning the domain; evaluating, within the environment, the tutoring content against the domain content, wherein the evaluating comprises (i) identifying missing tutoring content, (ii) identifying the difficulty of the tutoring content, and (iii) identifying question dependencies; and providing, at the environment, at least one recommendation, identified from results of the evaluation, for adjusting the tutoring content.

Another aspect of the invention provides an apparatus, comprising: at least one processor; and a computer readable storage medium having computer readable program code embodied therewith and executable by the at least one processor, the computer readable program code comprising: computer readable program code configured to receive, in an environment for developing a conversational tutor, domain content corresponding to a domain of the conversational tutor, wherein the conversational tutor comprises a conversational agent designed to assist students in learning a domain; computer readable program code configured to receive, at the environment, tutoring content developed by a user, wherein the tutoring content comprises a tutoring script comprising questions to be presented to the student during a tutoring session with the conversational tutor to assist the student in learning the domain; computer readable program code configured to evaluate, within the environment, the tutoring content against the domain content, wherein the evaluating comprises (i) identifying missing tutoring content, (ii) identifying the difficulty of the tutoring content, and (iii) identifying question dependencies; and computer readable program code configured to provide, at the environment, at least one recommendation, identified from results of the evaluation, for adjusting the tutoring content.

An additional aspect of the invention provides a computer program product, comprising: a computer readable storage medium having computer readable program code embodied therewith, the computer readable program code executable by a processor and comprising: computer readable program code configured to receive, in an environment for developing a conversational tutor, domain content corresponding to a domain of the conversational tutor, wherein the conversational tutor comprises a conversational agent designed to assist students in learning a domain; computer readable program code configured to receive, at the environment, tutoring content developed by a user, wherein the tutoring content comprises a tutoring script comprising questions to be presented to the student during a tutoring session with the conversational tutor to assist the student in learning the domain; computer readable program code configured to evaluate, within the environment, the tutoring content against the domain content, wherein the evaluating comprises (i) identifying missing tutoring content, (ii) identifying the difficulty of the tutoring content, and (iii) identifying question dependencies; and computer readable program code configured to provide, at the environment, at least one recommendation, identified from results of the evaluation, for adjusting the tutoring content.

A further aspect of the invention provides a method, comprising: obtaining content for an educational area that corresponds to an educational area of a dialog tutor being developed, wherein the dialog tutor comprises a conversational agent that assists students in learning concepts of the educational area; identifying concepts within the educational area by (i) parsing the content and (ii) extracting information from the parsed content; receiving tutoring input from a user, wherein the tutoring input comprises information identifying (i) question and answer pairs, (ii) hints, and (iii) assertions, to be provided during a tutoring session with the dialog tutor; evaluating the tutoring input against the content by assessing the quality of the tutoring input via a comparison of concepts included within the tutoring input against the concepts of the educational area; and providing, to the user, recommendations identified from the evaluating for modifying the tutoring input to increase the quality of the tutoring input.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

Developing or authoring a tutoring agent can be a very time consuming process. Generally, tutoring agents are developed by people who are experts in the domain associated with the tutoring agent. For example, if the tutoring agent is being developed to assist students in the psychology domain or educational area, the person developing the tutoring agent would be an expert in the psychology domain. Development of the tutoring agent requires the developer to create question and answer pairs, hints, assertions, and the like. Additionally, the developer must select different activities to be used to present different concepts. For example, the developer could choose to have a concept presented as a grouping activity, true/false activity, fill-in-the-blank activity, presentation of a question activity, or the like. However, while the developer may be confident in the tutoring content with respect to the domain knowledge, it may be difficult for the developer to know how the tutoring experience will translate to the student accessing the tutoring agent. In other words, while the tutoring content sufficiently covers the domain knowledge, the tutoring experience may be poor for the student due to the sequence of questions, repetitiveness of questions, difficult to understand questions, or the like.

Some traditional techniques assist developers in developing content. However, these traditional techniques are generally focused on a few specific areas. For example, one traditional system assists the developer in sequencing the content, specifically based upon how the content would be presented in a textbook or classroom. In other words, the content sequencing assistance does not attempt to identify questions that are dependent on other questions based upon the wording of the question. Another traditional system assists the developer author lower level concepts and relationships. Other systems assist the developer by generating generic metrics, for example, readability metrics, on the content. However, there is no existing tool to assist developers in creating good quality questions with relevant answers.

Additionally, most problems that students have with conversational tutors or tutoring agents are based upon the tutoring content and not the domain content. For example, students may have problems understanding the questions and/or answers presented by the conversational tutor. As another example, students may note that many questions and/or answers are repetitive, thereby making the tutoring agent experience boring, monotonous, or redundant. As a final example, students may note that the tutoring agent fails to cover specific concepts within the domain content. Currently no existing tools that can evaluate the tutoring content for content coverage, redundant content, difficulty of the content, and the like, to identify if changes should be made to the tutoring content in order to provide a better quality tutoring experience for the student accessing the tutoring agent.

Accordingly, the techniques and systems as described herein provide a system and technique for evaluating tutoring content for a conversational tutor and providing recommendations for adjusting or modifying the tutoring content. The system, for example, a development environment, receives domain content that corresponds to the domain of the conversational tutor. In other words, if the tutoring agent is being developed to assist with a mathematical domain or educational area, the system will receive the domain content corresponding to that mathematical domain or educational area. The system then parses and analyzes the domain content to learn about the domain. For example, the system may identify concepts included in the domain content and identify links between different concepts within the domain. As another example, the system may identify different metrics (e.g., frequency, concept dependencies, prerequisite concepts, importance, etc.) with relation to the concepts within the domain content.

A developer may then access the development environment and select the domain content for the authoring of the tutoring content. The developer may provide the tutoring content, for example, as a script that identifies question/answer pairs, hints, assertions, tutoring content sequencing, and the like. The developer may also identify different activities regarding how the content should be presented, for example, as short answer questions, concept grouping activities, true/false questions, or the like. The tutoring content is the content presented to the student during a session with the tutoring agent. Thus, the tutoring content may include any information that is needed by the system in order to provide the tutoring experience to the student. The system can then evaluate the tutoring content against the domain content to determine if the tutoring content needs to be modified or adjusted to provide a better experience for the student. For example, the system may identify if any tutoring content is missing, domain content is not covered, the difficulty of the tutoring content, question dependencies, redundancy of questions, and the like. From this evaluation the system can provide recommendations to the developer for modifying or adjusting the tutoring content to make a better student experience.

Such a system provides a technical improvement over current systems for assisting in developing tutoring agents. The system described herein provides an environment for developing a tutoring agent that can evaluate the tutoring content provided by a developer. The systems and methods can evaluate the tutoring content against the domain content to determine the content coverage of the tutoring content. The systems and methods can simulate dialog flows to identify question dependencies. Additionally, the system can analyze the questions, answers, assumptions, and hints, to determine the difficulty of the tutoring content. From this evaluation the system can provide recommendations to the developer on techniques for modifying or adjusting the tutoring content to make a better student experience.

Traditional systems rely on student input after deployment of the tutoring agent, thereby requiring the developer to rework the tutoring content in light of this student feedback. Thus, rather than in conventional systems which, at best, can support development of a tutoring agent through assistance in content sequencing, generic metrics, and other superficial development assistance, the described systems and methods can provide a more in-depth analysis and evaluation of the tutoring content in order to ensure a smooth student experience. Accordingly, the systems and methods provide a technique that is more effective than traditional techniques in creating a better student experience, thereby reducing the time and cost associated with developing tutoring agents by reducing the amount of rework that may be necessary by the developer using the traditional systems.

Figure 1:
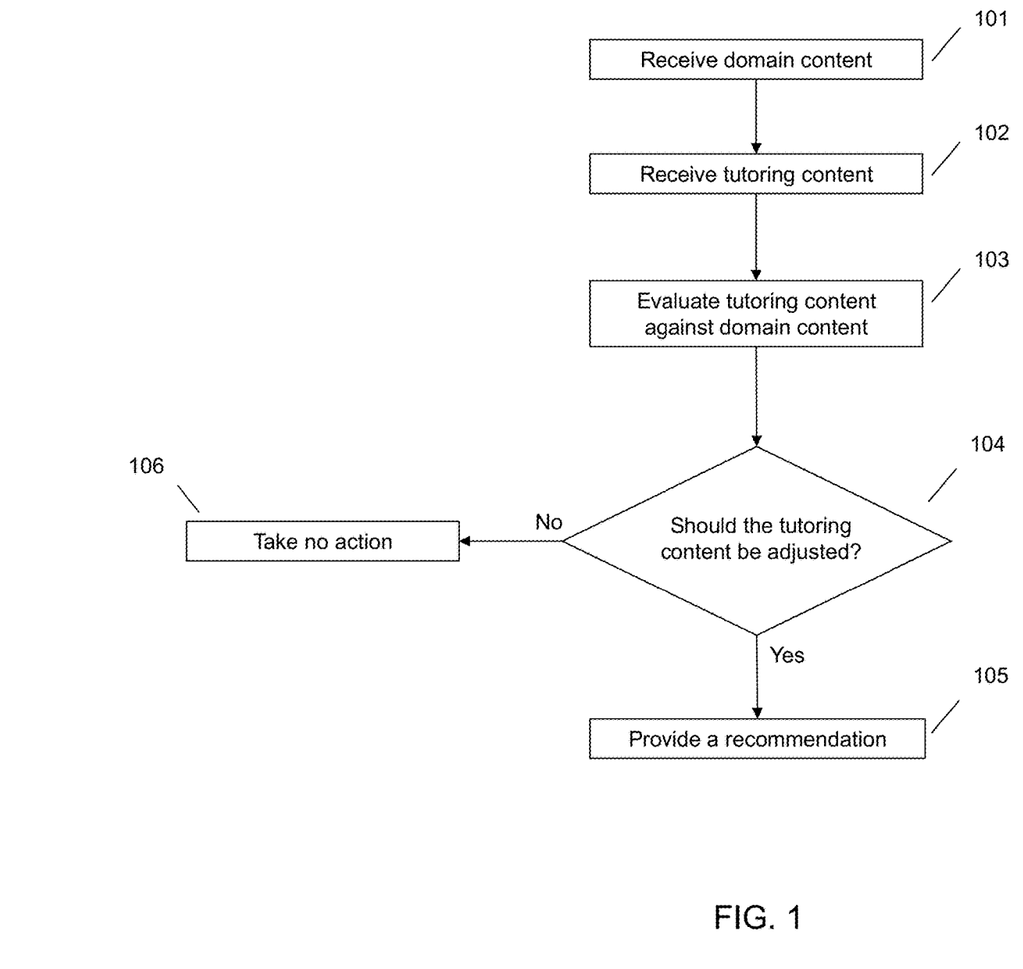
FIG. 1 illustrates a method of evaluating tutoring content for a conversational tutor and providing recommendations for adjusting the content.

FIG. 1 illustrates a method for evaluating tutoring content for a conversational tutor and providing recommendations for adjusting or modifying the tutoring content. At 101 the system receives domain content corresponding to a domain of a conversational tutor, tutoring agent, or dialog tutor. Receipt of the domain content may be at an environment for developing the conversational tutor, for example, a development environment. The development environment may be an environment that is similar to code development environments. For example, the development environment may provide a user interface that allows a developer to provide code or other instructions that can then be translated to a deployment environment. The development environment may include different windows and/or sections that display different aspects of the environment. For example, one section may display a hierarchical organization of the tutoring content and may allow a developer to organize the tutoring content. As another example, one section may provide a section for the developer to create the tutoring content. As another example, one section may provide a summary of possible errors, warnings, or recommendations for modifications that should be made to the tutoring content.

The domain content may be content that is relevant or related to the domain of the tutoring agent. For example, if the tutoring agent that is being developed is intended to assist students in learning about biology, the domain content may be biology content. Different sources of domain content may include textbooks, curriculum standards, reference videos, audio lectures, course notes, classroom syllabi, or any other material pertinent to the domain or educational area. The domain content may be provided to the system through a developer or other user uploading the content to the system, a user providing a link to the content, the system accessing secondary sources (e.g., the Internet, course notes, curriculum standards, etc.) to capture content related to the domain.

Once the system has received the domain content, the system may analyze, for example, using a domain content analyzer, the domain content in order to understand the domain. To perform this analysis the system may parse the content and extract information, including metadata, from the domain content. In the event that the domain content is provided in a format other than a text format, the analysis may include converting the content to a text format, for example, using a speech-to-text analysis technique, converting video to a transcript, or the like. The domain content analysis may include chunking the content using semantic and/or syntactic analysis, natural language processing, or other analysis techniques. The system may also link topics or concepts included in the domain content in order to indicate those concepts or topics that are related, dependent on other topics, prerequisites for other topics, or the like.

Figure 2:
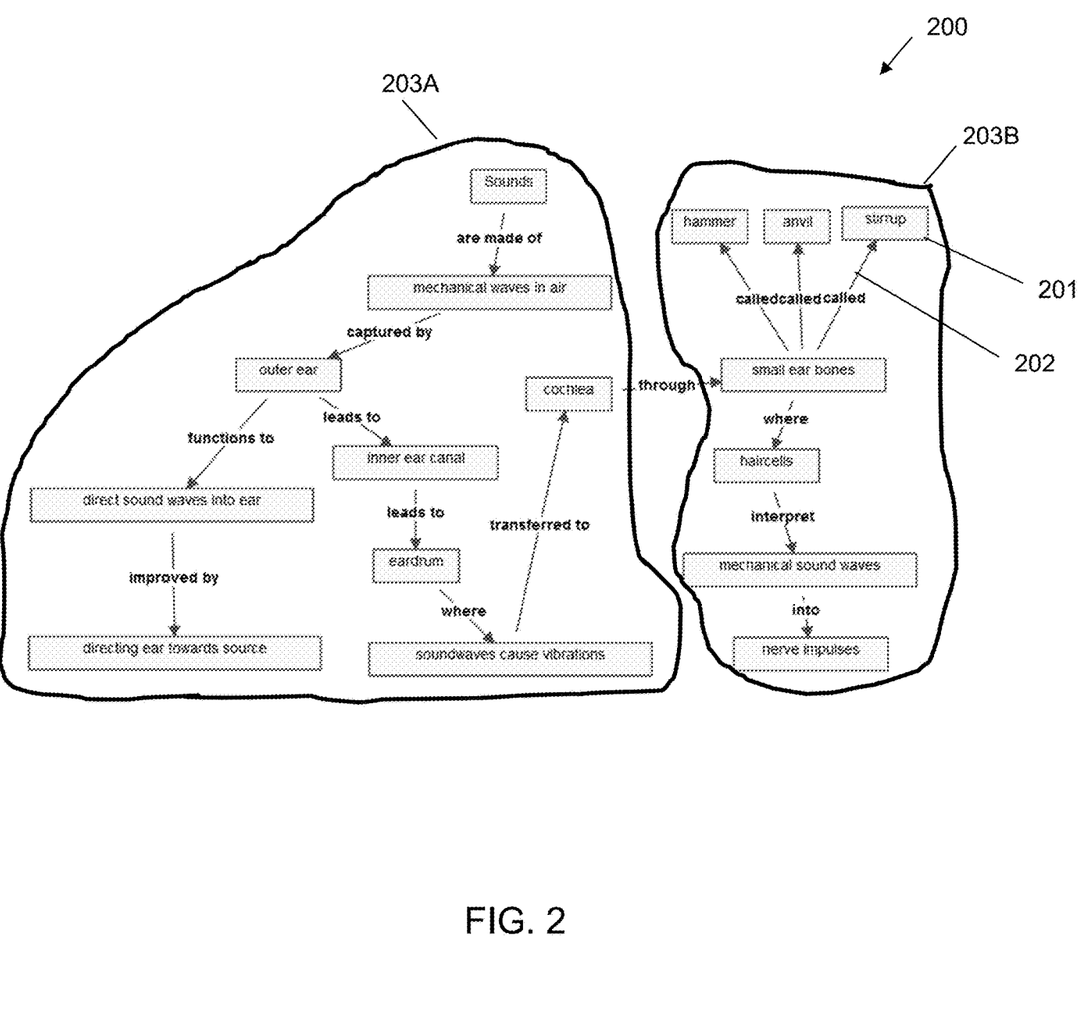
FIG. 2 illustrates a concept graph.

The system may create a concept graph from the domain content, for example, as shown in FIG. 2. The concept graph 200 includes nodes 201 that correspond to a topic or concept. The nodes 201 are connected to each other via edges 202 that correspond to the relationship between the nodes that are connected by the edge. The system may also group the nodes into groups of concepts 203A and 203B based upon the relationship between different nodes 201 of the concept graph 200. The system may also extract metrics regarding concepts within the domain content, for example, how frequently a concept is discussed in the domain content, which concepts are dependent on other concepts, whether a concept has a prerequisite concept, how important a concept is to the domain, and the like.

At 102 the system receives tutoring content developed by a user or developer. This tutoring content may be developed in the development environment. Tutoring content is the content provided by the developer that identifies what material and/or concepts are to be covered during a tutoring session. Essentially the tutoring content acts as a tutoring script that identifies questions that should be presented to the student during a tutoring session. However, although it may, the script does not necessarily identify a particular order for the questions to be presented. Rather, the tutoring content may simply identify a high-level order, so that concepts are presented in a coherent manner. This allows for the tutoring agent during deployment to modify the tutoring session for the particular student. For example, if one student is struggling with the content, the system may choose to present every possible question to the student. On the other hand, if the student appears to have a high mastery of the content, the tutoring agent may not present every question and may only present certain questions to make sure that the student understands the concept. The tutoring content may also include provision of hints and/or assertions that can be provided by the tutoring agent.

In authoring or developing the tutoring content, the developer may also identify different activities that should be presented to the student during a session with the tutoring agent. For example, the developer may identify that certain content should be provided as a fill-in-the-blank activity, a short answer activity, a true-false activity, a concept grouping activity, an answer selection activity, or the like. The activities that are chosen may be modified for different students, particularly based upon mastery level. For example, a student who appears to be struggling with a concept may be presented the concept as one activity type, whereas a student who appears to have a high mastery of the concept may be presented the concept as a different activity type. As discussed in more detail below, the activity type may be recommended to the developer based upon an evaluation of the tutoring content.

At 103 the system may evaluate the tutoring content against the domain content. Evaluating the tutoring content may be performed by a tutoring content analyzer. The tutoring content analysis may include parsing the tutoring content into questions, answers, assertions, hints, and the like. The system may then compute tutoring content metrics to determine if any tutoring content is missing, identify a difficulty level of the tutoring content, identify question dependencies, identify the overall quality of the tutoring content, and the like. One of the content metrics may include identification of redundancy of questions, answers, and/or question-answer pairs. For example, the system may analyze the questions, answers, and/or question-answer pairs to determine if there is any overlap or similarity between other questions, answers, and/or question-answer pairs.

The system may also determine a dependency metric. Dependency metrics may identify whether the questions are dependent upon a previous question or answer. One technique for determining a dependency is determining whether the question includes any anaphors, which are words or phrases that refer to an earlier word or phrase. For example, if one question refers to "sound" and a subsequent question refers to "it", there is a dependency between the two questions, even if the concepts of the questions are not dependent on each other. In other words, the system may identify that the developer has developed a question that requires a first question to be asked, even if the question referred to would not need to be asked every time. Determining a dependency may also include simulating the dialog flow of the tutoring agent. For example, the system may simulate the sequence of questions as presented in the tutoring content and evaluate the independence of question-answer pairs, for example, using the concept graph to evaluate the relationships of the concepts within the concept graph. The system may simulate multiple scenarios to identify whether any discrepancies in content exist.

Figure 3:
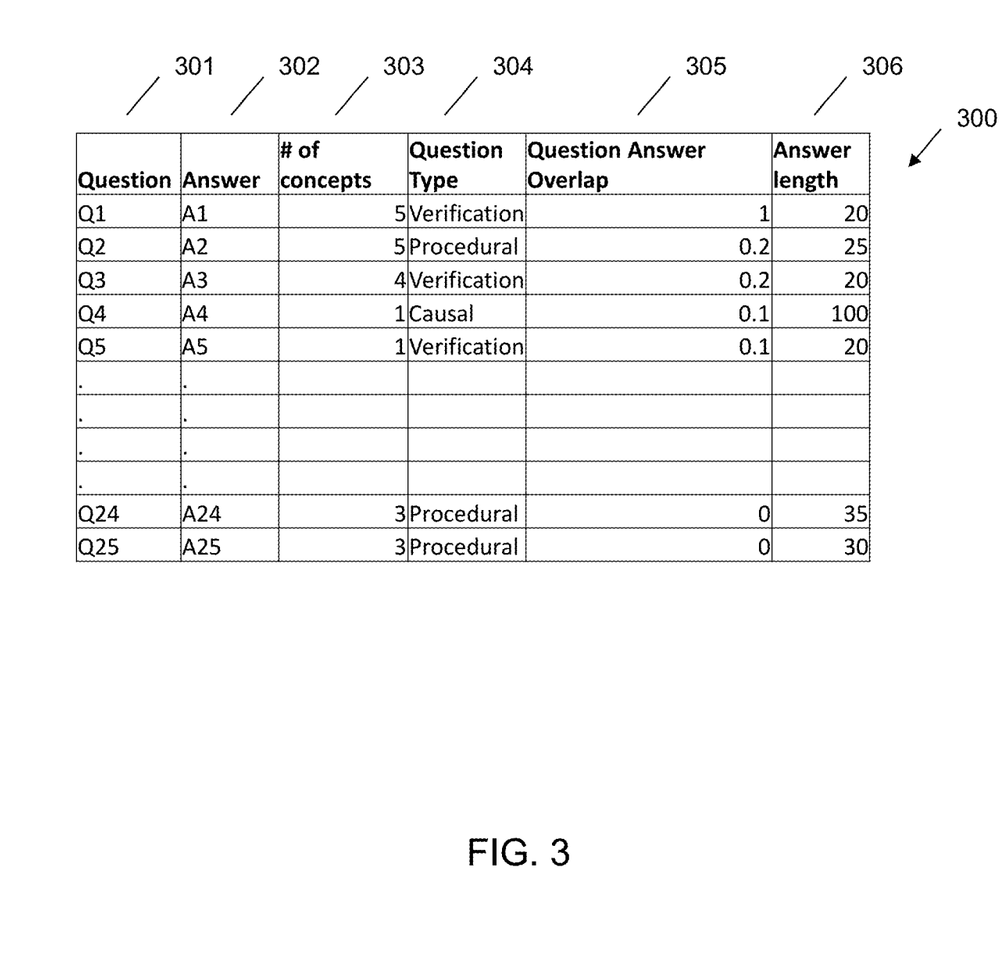
FIG. 3 illustrates an analysis for the quality of the tutoring content.

Another content metric may include a difficulty of the tutoring content. To identify the difficulty the system may analyze the question, answer, and/or question-answer pair to determine how many concepts are covered in a single question, answer, and/or question-answer pair. A question, answer, and/or question-answer pair having multiple concepts may be considered more difficult than one having a single concept. The difficulty may also be assessed based upon the number of clauses, conjunctions, or length of a question, answer, and/or question-answer pair. These metrics may assist in identifying a complexity of the question, answer, and/or question-answer pair which may indicate a difficulty of the tutoring content. The system may also classify the questions into different question types (e.g., procedural, verification, causal, factual, etc.), which may assist in determining a difficulty of the question. An example quality analysis is illustrated in FIG. 3. As shown in the chart 300 the system has identified which questions 301 and answers 302 correspond to each other, the number of concepts covered in the question-answer pair 303, the question type 304, the amount of overlap between the question-answer pair and other question-answer pairs 305, and the length of the answer 306. All of these metrics can be used to determine an overall quality of the tutoring content.

Figure 4:
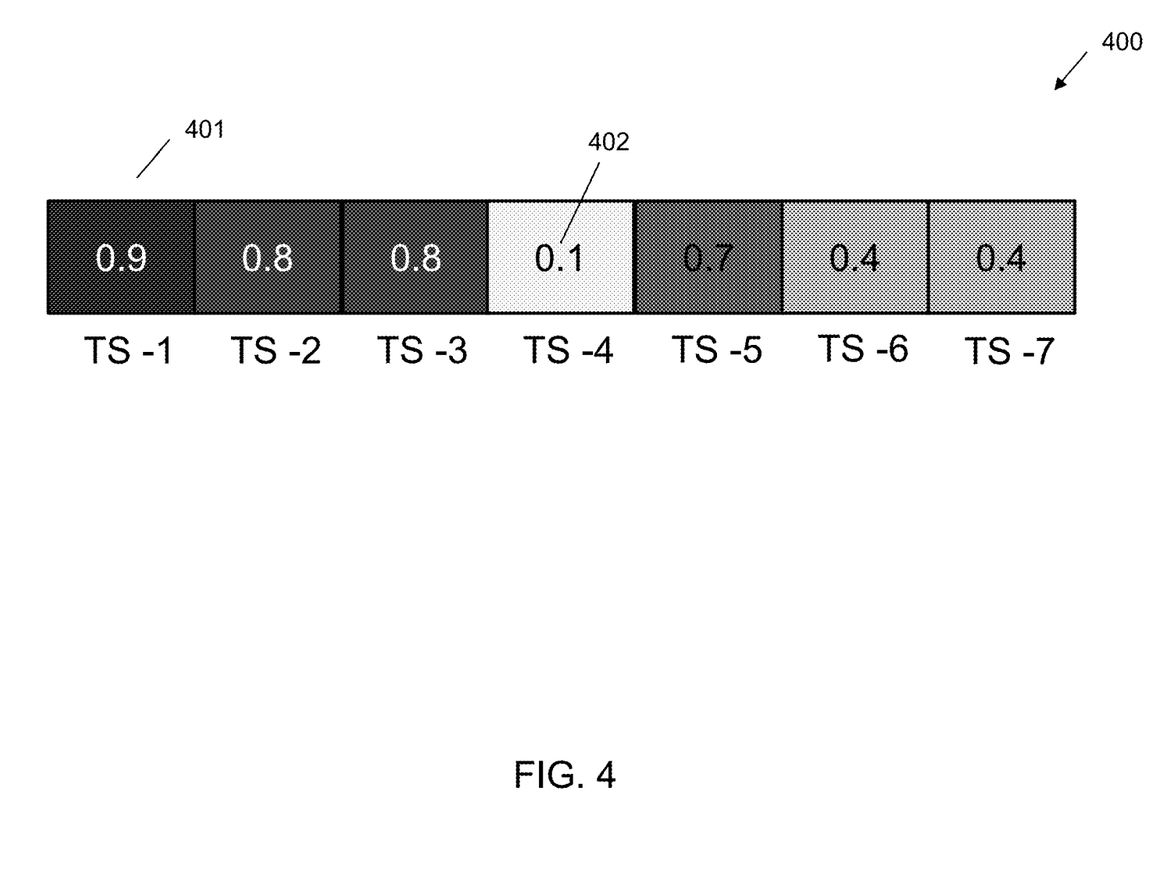
FIG. 4 illustrates an analysis of the content coverage of the tutoring content.

The evaluation may also include determining the coverage of the tutoring content with respect to the domain content. In other words, the system can determine if any topics or concepts within the domain are not covered by the tutoring content. To perform this analysis the system may compare the questions, answers, and question-answer pairs to the content. Since the content was previously broken into concept chunks, the system can "mark" a question, answer, and/or question-answer pair as belonging to a particular concept chunk or text segment. After all the questions, answers, and/or question/answer pairs have been assigned to a concept chunk or text segment, the system can then generate a chart or other indicate that identifies how much of the concept is covered by the tutoring content. As an example, FIG. 4 illustrates an example content coverage indicator 400. Each of the domain concepts is represented by a text segment or box 401. Within each box a number 402, represented as a percentage, identifies how much of the concept is covered by the tutoring content. For example, 90% of the concept associated with text segment-1 (TS-1) is covered by the tutoring content. On the other hand only 10% of the concept associated with TS-4 is covered by the tutoring content. As illustrated in FIG. 4, the coverage indicator may be color coded in order to more quickly visualize the content coverage.

The evaluation of the tutoring content may also include capturing additional information once the tutoring agent has been deployed. During deployment, the system may capture information from the student, for example, gaze information, student activity information, a length of time a student spends with a question, or other student behavioral information. This information may be used by the system to help determine if students are struggling with particular aspects of the tutoring content. The system may also use other information regarding the student, for example, the student's mastery level, to determine if content designed for a specific student type (e.g., low mastery level vs. high mastery level, beginning student vs. advanced student, etc.) is suitable for that student type. In other words, if students appear to be struggling with the tutoring content that was designed to be presented to high mastery level students, the system may determine that the content is too difficult.

Evaluating the tutoring content may also include evaluating the content for suitability as being presented as a particular activity. This evaluation may be based upon a difficulty level of the question, the redundancy of a question, how many concepts are covered by a question, and the like. Some activities may be more suitable depending on these metrics. For example, a question that only covers a few concepts may not be suitable for concept grouping activity or fill-in-the-blank activity, but may be suitable for a true-false activity. To determine which activities may be more applicable, the system may use all the metrics identified from the question, answer, and/or question-answer pairs and train a multi-class classifier to predict or calculate an activity score. The activity score may indicate how suitable a question is to a particular activity. For example, if a question is analyzed for a fill-in-the-blank activity and the result is a low activity score, the system may determine that the fill-in-the-blank activity is not a good activity choice.

At 104 the system may determine whether the tutoring content should be adjusted based upon the evaluation at 103. If the system determines that the tutoring content should not be adjusted, the system may take no action at 106 or indicate that the tutoring content is acceptable to the developer. If, on the other hand, the system determines that the tutoring content should be adjusted or modified at 104, the system may provide a recommendation for adjusting the tutoring content at 105. Determining that the tutoring content should be adjusted may be based upon the evaluation identifying discrepancies between the tutoring content and the domain content, for example, that tutoring content is missing, too many questions are dependent on other questions, the difficulty of the tutoring content is too high, there are too many redundant questions, or any other indicators that the user experience will be poor.

Provision of a recommendation may include any recommendation to the developer that would assist in correcting any discrepancies identified during the evaluation. For example, if the evaluation identifies that many questions include anaphors, the recommendation may include suggesting that the developer replace the anaphors with the referenced word or phrase. As another example, if the evaluation identifies that the tutoring content is very difficult, the recommendation may include indicating that the tutoring content is difficult and provide recommendations on what should be modified to make the content less difficult. The recommendation may be based upon the metric that was identified as causing the content to be difficult. For example, if the content is considered difficult because the question covers many concepts, the recommendation may be to reduce the number of concepts covered by the questions. As another example, if the evaluation identifies that some tutoring content is missing, specifically, that the tutoring content fails to cover a particular concept within the domain, the recommendation may include recommending that one or more questions be added to cover the missing domain concepts.

A recommendation may also include a recommendation of an activity for a particular concept. The recommendation of an activity may also include recommending a different activity for a concept. For example, if the developer identified one activity for a concept and the system identifies an activity that may be better or identifies that the selected activity is not suitable, for example, as indicated by the activity score, the recommendation may identify the more suitable activity.

Providing at least one recommendation may also include the system requesting confirmation from the developer of concepts identified by the system as important. For example, if a question is presented as a short answer question, the student may provide the answer in a variety of different formats. In order to determine if the student has provided the correct answer, the system usually determines if the important concepts are included in the answer. However, if the system incorrectly determines the important concepts, the answer may be identified as incorrect even though it is actually a correct answer. Therefore, the system may request that the developer confirm that the concepts identified by the system as important are actually the important concepts.

Thus, such a system provides a technical improvement to current tutoring agent developments by providing a system that can evaluate the tutoring content against the domain content and providing recommendations for adjusting the tutoring content to make a better tutoring experience for students. Accordingly, as opposed to conventional system which, at best, only assist with specific aspects of developing the content, the described system and method provides a mechanism to evaluate the entire tutoring agent before deployment, thereby reducing time and cost associated with reworking the tutoring agent after receiving feedback after deployment.

Figure 5:
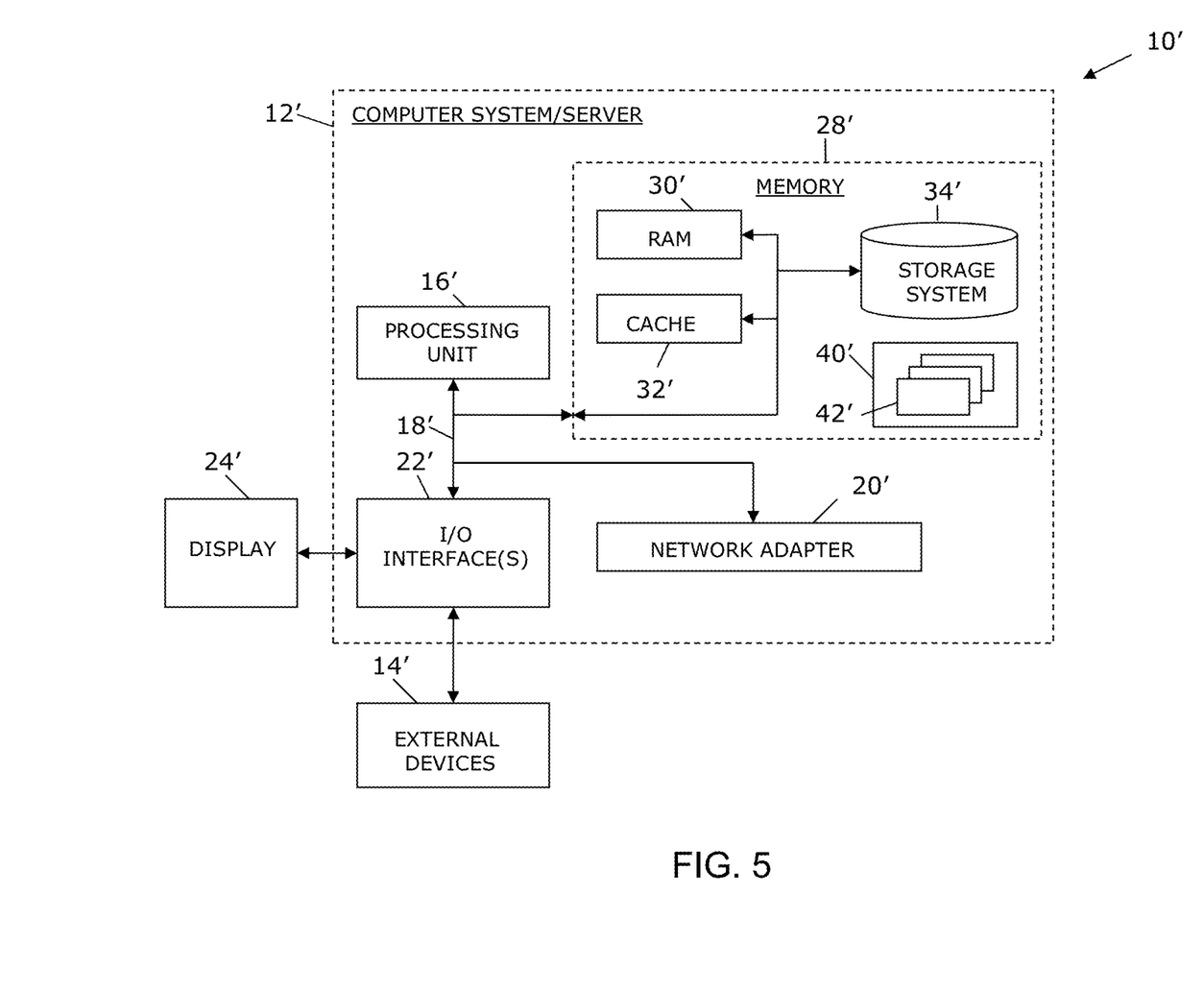
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:

receiving, within a user interface of a software development environment for developing a conversational tutor and from a tutoring content developer, domain content corresponding to a domain of the conversational tutor, wherein the conversational tutor comprises a conversational agent designed to assist students in learning a domain, wherein the domain content comprises concept chunks, each of the concept chunks corresponding to a concept within the domain content;

receiving, at the user interface of the software development environment, tutoring content in a computer code format and developed by a user in one of a plurality of sections of the user interface, wherein the tutoring content comprises a tutoring script comprising questions to be presented to the student during a tutoring session with the conversational tutor to assist the student in learning the domain and wherein the tutoring script identifies a sequencing of the tutoring content and activities for portions of the tutoring content, wherein the tutoring content is displayed within another of the plurality of sections of the user interface in a hierarchical organization allowing the tutoring content developer to interact with and organize the tutoring content, wherein the plurality of sections for interface by the tutoring content developer for developing and modifying the tutoring content;

evaluating, within the software development environment using a tutoring content analyzer of the development environment, the tutoring content against the domain content, wherein the evaluating comprises (i) identifying missing tutoring content, (ii) identifying the difficulty of the tutoring content, and (iii) identifying question dependencies, wherein the evaluating comprises parsing the tutoring content into at least questions and answers and computing tutoring content metrics for the tutoring content using the parsed tutoring content, wherein identifying missing tutoring content comprises determining the tutoring content fails to cover at least one topic found within the domain by matching questions, answers, and question-answer pairs of the tutoring content against text segments within the concept chunks of the domain content and identifying a concept chunk is not covered by the tutoring content by identifying a text segment within the concept chunk not having a match within the tutoring content, wherein the evaluating comprises predicting, utilizing a multi-class classifier trained on metrics from questions, answers, and question-answer pairs of historical tutoring content, an activity score for a portion of the tutoring content as being presented as a particular activity and recommending an activity for the portion of the tutoring content based upon a corresponding activity score predicted for each of a plurality of activities;

providing, at the user interface of the software development environment and within one of the plurality of sections, at least one recommendation, identified from results of the evaluation, for adjusting the tutoring content; and deploying the conversational agent, wherein the deploying comprises translating instructions of the adjusted tutoring content from code within the development environment to a deployment environment.

2. The method of claim 1, wherein the identifying question dependencies comprises simulating a dialog flow of the conversational tutor.

3. The method of claim 1, wherein the identifying the difficulty of the tutoring content comprises identifying the complexity of questions and answers contained within the tutoring content.

4. The method of claim 1, wherein the evaluating comprises identifying a redundancy of questions and answers within the tutoring content by identifying an overlap of text between questions and answers contained within the tutoring content.

5. The method of claim 1, wherein the evaluating comprises (i) capturing interaction information from at least one student interacting with the conversational tutor during deployment of the conversational tutor and (ii) determining, from the interaction information, if the at least one student is experiencing difficulty with the tutoring content of the conversational tutor.

6. The method of claim 1, wherein the providing at least one recommendation comprises recommending at least one tutoring activity for a concept within the domain, to be included in the tutoring content.

7. An apparatus, comprising:

at least one processor; and a computer readable storage medium having computer readable program code embodied therewith and executable by the at least one processor, the computer readable program code comprising:

computer readable program code configured to receive, within a user interface of a software development environment for developing a conversational tutor and from a tutoring content developer, domain content corresponding to a domain of the conversational tutor, wherein the conversational tutor comprises a conversational agent designed to assist students in learning a domain, wherein the domain content comprises concept chunks, each of the concept chunks corresponding to a concept within the domain content;

computer readable program code configured to receive, at the user interface of the software development environment, tutoring content in a computer code format and developed by a user in one of a plurality of sections of the user interface, wherein the tutoring content comprises a tutoring script comprising questions to be presented to the student during a tutoring session with the conversational tutor to assist the student in learning the domain and wherein the tutoring script identifies a sequencing of the tutoring content and activities for portions of the tutoring content, wherein the tutoring content is displayed within another of the plurality of sections of the user interface in a hierarchical organization allowing the tutoring content developer to interact with and organize the tutoring content, wherein the plurality of sections for interface by the tutoring content developer for developing and modifying the tutoring content;

computer readable program code configured to evaluate, within the software development environment using a tutoring content analyzer of the development environment, the tutoring content against the domain content, wherein the evaluating comprises (i) identifying missing tutoring content, (ii) identifying the difficulty of the tutoring content, and (iii) identifying question dependencies, wherein the evaluating comprises parsing the tutoring content into at least questions and answers and computing tutoring content metrics for the tutoring content using the parsed tutoring content, wherein identifying missing tutoring content comprises determining the tutoring content fails to cover at least one topic found within the domain by matching questions, answers, and question-answer pairs of the tutoring content against text segments within the concept chunks of the domain content and identifying a concept chunk is not covered by the tutoring content by identifying a text segment within the concept chunk not having a match within the tutoring content, wherein the evaluating comprises predicting, utilizing a multi-class classifier trained on metrics from questions, answers, and question-answer pairs of historical tutoring content, an activity score for a portion of the tutoring content as being presented as a particular activity and recommending an activity for the portion of the tutoring content based upon a corresponding activity score predicted for each of a plurality of activities;

computer readable program code configured to provide, at the user interface of the software development environment and within one of the plurality of sections, at least one recommendation, identified from results of the evaluation, for adjusting the tutoring content; and computer readable program code configured to deploy the conversational agent, wherein the deploying comprises translating instructions of the adjusted tutoring content from code within the development environment to a deployment environment.

8. A computer program product, comprising:

a computer readable storage medium having computer readable program code embodied therewith, the computer readable program code executable by a processor and comprising:

computer readable program code configured to receive, within a user interface of a software development environment for developing a conversational tutor and from a tutoring content developer, domain content corresponding to a domain of the conversational tutor, wherein the conversational tutor comprises a conversational agent designed to assist students in learning a domain, wherein the domain content comprises concept chunks, each of the concept chunks corresponding to a concept within the domain content;

computer readable program code configured to receive, at the user interface of the software development environment, tutoring content in a computer code format and developed by a user in one of a plurality of sections of the user interface, wherein the tutoring content comprises a tutoring script comprising questions to be presented to the student during a tutoring session with the conversational tutor to assist the student in learning the domain and wherein the tutoring script identifies a sequencing of the tutoring content and activities for portions of the tutoring content, wherein the tutoring content is displayed within another of the plurality of sections of the user interface in a hierarchical organization allowing the tutoring content developer to interact with and organize the tutoring content, wherein the plurality of sections for interface by the tutoring content developer for developing and modifying the tutoring content;

computer readable program code configured to evaluate, within the software development environment using a tutoring content analyzer of the development environment, the tutoring content against the domain content, wherein the evaluating comprises (i) identifying missing tutoring content, (ii) identifying the difficulty of the tutoring content, and (iii) identifying question dependencies, wherein the evaluating comprises parsing the tutoring content into at least questions and answers and computing tutoring content metrics for the tutoring content using the parsed tutoring content, wherein identifying missing tutoring content comprises determining the tutoring content fails to cover at least one topic found within the domain by matching questions, answers, and question-answer pairs of the tutoring content against text segments within the concept chunks of the domain content and identifying a concept chunk is not covered by the tutoring content by identifying a text segment within the concept chunk not having a match within the tutoring content, wherein the evaluating comprises predicting, utilizing a multi-class classifier trained on metrics from questions, answers, and question-answer pairs of historical tutoring content, an activity score for a portion of the tutoring content as being presented as a particular activity and recommending an activity for the portion of the tutoring content based upon a corresponding activity score predicted for each of a plurality of activities;

computer readable program code configured to provide, at the user interface of the software development environment and within one of the plurality of sections, at least one recommendation, identified from results of the evaluation, for adjusting the tutoring content; and computer readable program code configured to deploy the conversational agent, wherein the deploying comprises translating instructions of the adjusted tutoring content from code within the development environment to a deployment environment.

9. The computer program product of claim 8, wherein the identifying missing tutoring content comprises (i) comparing the tutoring content to the domain content and (ii) identifying concepts within the domain content not covered by the tutoring content.

10. The computer program product of claim 8, wherein the identifying the difficulty of the tutoring content comprises identifying the complexity of questions and answers contained within the tutoring content.

11. The computer program product of claim 8, wherein the evaluating comprises identifying a redundancy of questions and answers within the tutoring content by identifying an overlap of text between questions and answers contained within the tutoring content.

12. The computer program product of claim 8, wherein the evaluating comprises (i) capturing interaction information from at least one student interacting with the conversational tutor during deployment of the conversational tutor and (ii) determining, from the interaction information, if the at least one student is experiencing difficulty with the tutoring content of the conversational tutor.

13. The computer program product of claim 8, wherein the providing at least one recommendation comprises recommending at least one tutoring activity for a concept within the domain, to be included in the tutoring content.

* * * * *